(12) United States Patent
Reid et al.

(10) Patent No.: US 6,308,809 B1
(45) Date of Patent: Oct. 30, 2001

(54) CRASH ATTENUATION SYSTEM

(75) Inventors: John D. Reid; John R. Rohde; Dean L. Sicking, all of Lincoln, NE (US)

(73) Assignee: Safety By Design Company, Lincoln, NE (US)

( * ) Notice: Subject to any disclaimer, the term of this patent is extended or adjusted under 35 U.S.C. 154(b) by 0 days.

(21) Appl. No.: 09/307,235

(22) Filed: May 7, 1999

(51) Int. Cl.[7] .............................................. F16F 7/12
(52) U.S. Cl. ................................................... 188/377
(58) Field of Search ................................ 188/371, 374, 188/376, 377; 74/492; 293/133

(56) References Cited

U.S. PATENT DOCUMENTS

| | | | |
|---|---|---|---|
| 3,143,321 | * 8/1964 | McGehee et al. | 188/376 |
| 3,608,677 | * 9/1971 | Wykes | 188/376 |
| 3,744,338 | * 7/1973 | Komatsu et al. | 74/492 |
| 3,916,720 | * 11/1975 | Smith | 188/374 |
| 4,336,868 | * 6/1982 | Wilson et al. | 188/376 |
| 5,181,589 | * 1/1993 | Siegner et al. | 188/374 |
| 5,351,791 | * 10/1994 | Rosenzweig | 188/374 |
| 5,732,801 | * 3/1998 | Gertz | 293/133 |
| 5,875,875 | * 3/1999 | Knotts | 188/374 |

* cited by examiner

Primary Examiner—Chris Schwartz
(74) Attorney, Agent, or Firm—Jackson Walker L.L.P.

(57) ABSTRACT

A crash attenuation system having an impact head, and energy absorption mechanism. The energy absorbing mechanism has a mandrel for rupturing thin-walled tubes in a controlled rupture to absorb impact forces from a colliding vehicle. A frame may be used to mount the system to a truck, trailer, guardrail, median barrier end treatment, or a crash cushion. Stress concentrators may be incorporated into the tubes and the mandrels to selectively control rupturing and energy dissipation.

14 Claims, 4 Drawing Sheets

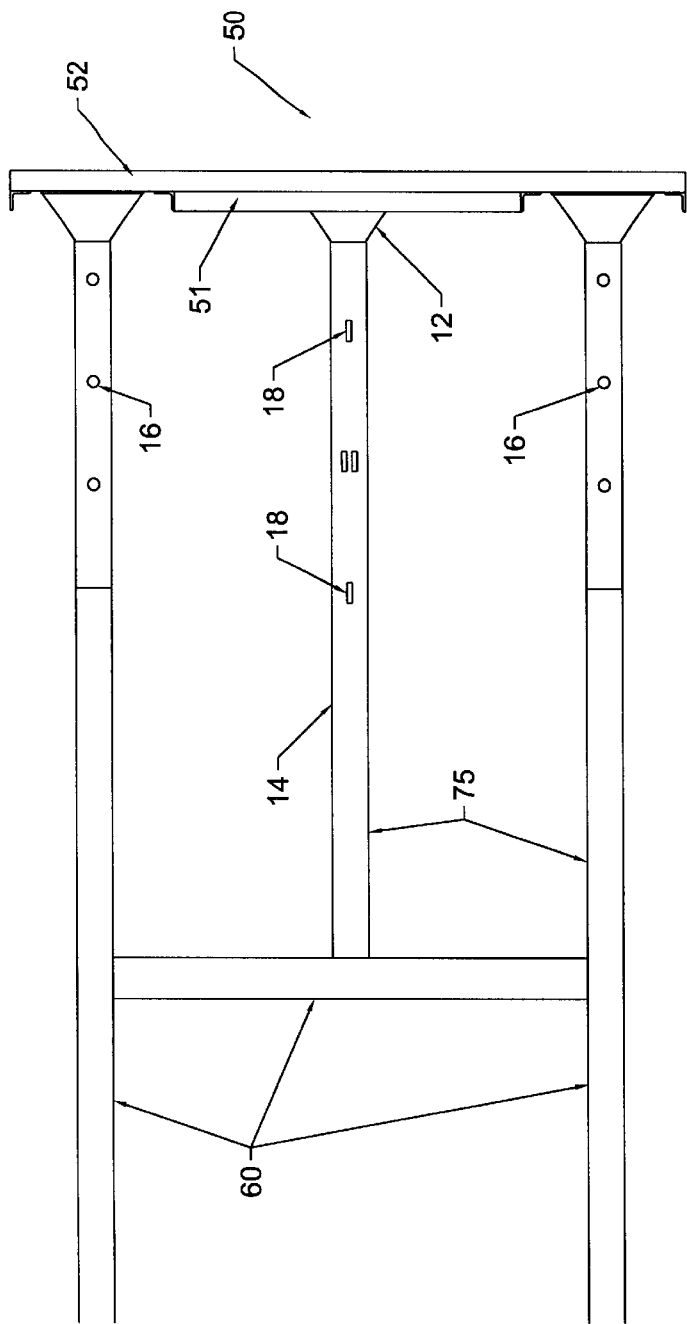
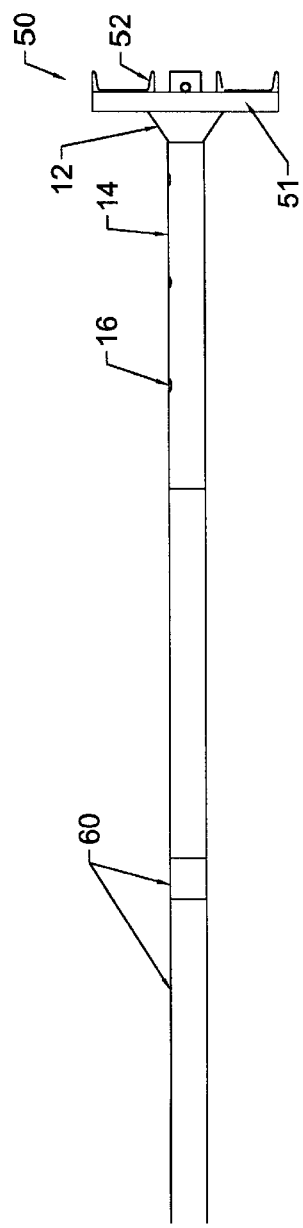
FIG. 3A
FIG. 3B

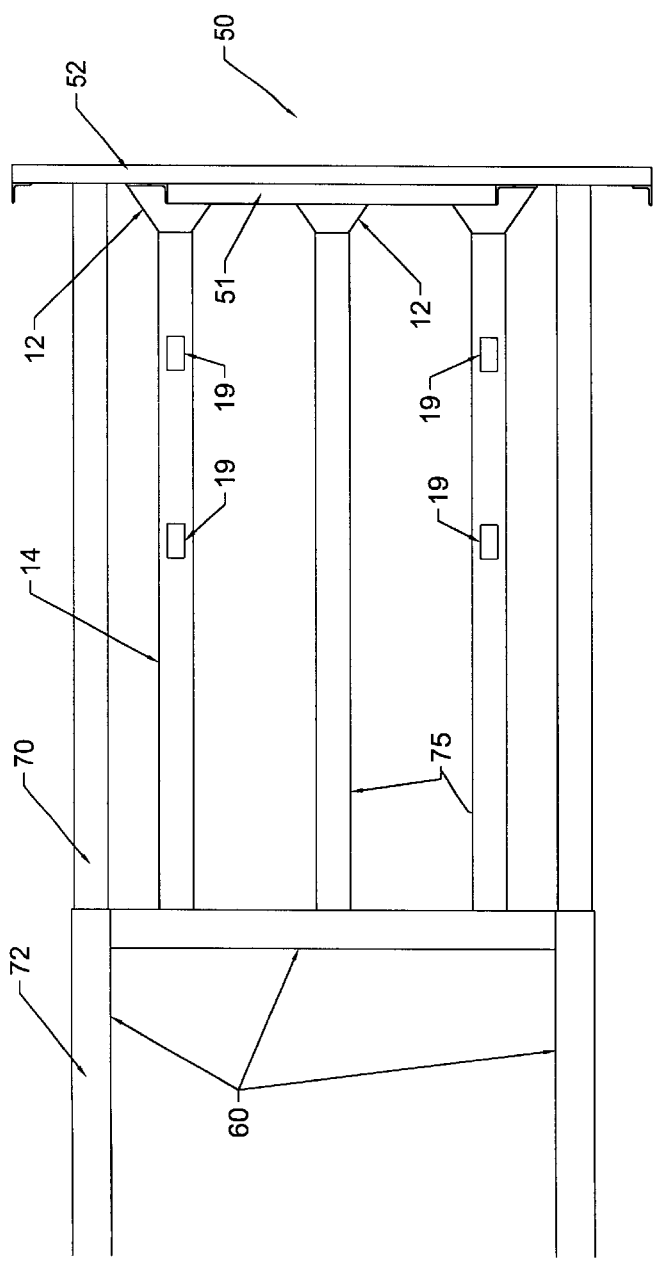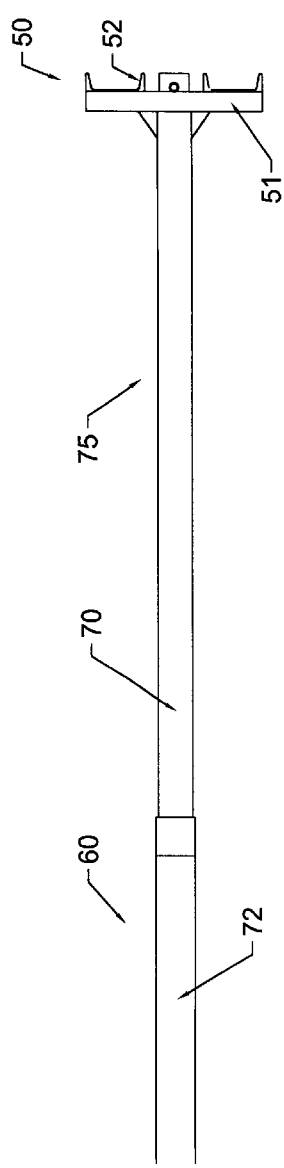
FIG. 4A
FIG. 4B

CRASH ATTENUATION SYSTEM

BACKGROUND OF THE INVENTION

The present invention relates to a traffic crash attenuation system. More particularly, the present invention includes a system, method and apparatus for absorbing the kinetic energy from an impacting vehicle in a controlled and safe manner with roadside safety devices such as: guardrails and median barrier end treatments, crash cushions, and truck mounted attenuators. Specifically, the present invention provides a system for the controlled rupturing of a tubular member by a mandrel whereby forces of an impacting vehicle are absorbed.

U.S. Pat. No. 4,200,310 illustrates an energy absorbing system which utilizes a number of cylindrical energy absorbing members placed in a series-type relationship on a frame mounted to a truck. The system is provided with an alignment or guidance frame. However, there is nothing which teaches any selectively controlling the rupture of the cylindrical members. The mechanism of energy dissipation is significantly different than that of the present invention.

U.S. Pat. No. 3,143,321, teaches the use of a frangible tube for energy dissipation. As with the present invention, the apparatus disclosed in U.S. Pat. No. 3,143,321 uses a mandrel receivable within a tubular member. However, there is no teaching of a means for selectively controlling the rupturing along a length of the tubular member.

SUMMARY OF THE INVENTION

The crash attenuation system of the present invention provides an impact head attached to an energy absorption mechanism. The energy absorption mechanism has one or more mandrels with a certain tensile strength or hardness attached to the impact head. Attached to the head are one or more tubular members which have second tensile strengths or hardnesses, generally lower than those of the mandrels. The mandrels are receivable in a first end of the tubular members such that upon impact forces being applied to the impact head, the mandrels are forced through the tubular members rupturing, rather than fragmenting, the tubular members and absorbing the impact forces. The rupturing may be controlled by any number or combination of stress concentrating elements such as placing holes, notches, acts, scores, preferential material orientation, or slots in the tubular members, providing gussets (or any strengthening member) along the length of the tubular members, or providing the mandrels with stress concentrators such as gussets or mandrel geometry so that as the mandrels are urged through the tube the rupturing is controlled.

BRIEF DESCRIPTION OF THE DRAWINGS

FIG. 3A shows a top plan view of the present invention with the controlled fracture energy absorbers attached to the impact head and trailer or truck mounted frame elements.

FIG. 3B is a side elevation view of the illustration of FIG. 3A.

FIG. 4A shows a top plan view of the present invention with an alignment member attached to the trailer or truck mounted frame.

FIG. 4B is a side elevation view of the illustration of FIG. 3C.

DETAILED DESCRIPTION OF THE PREFERRED EMBODIMENT

Figure 1A:
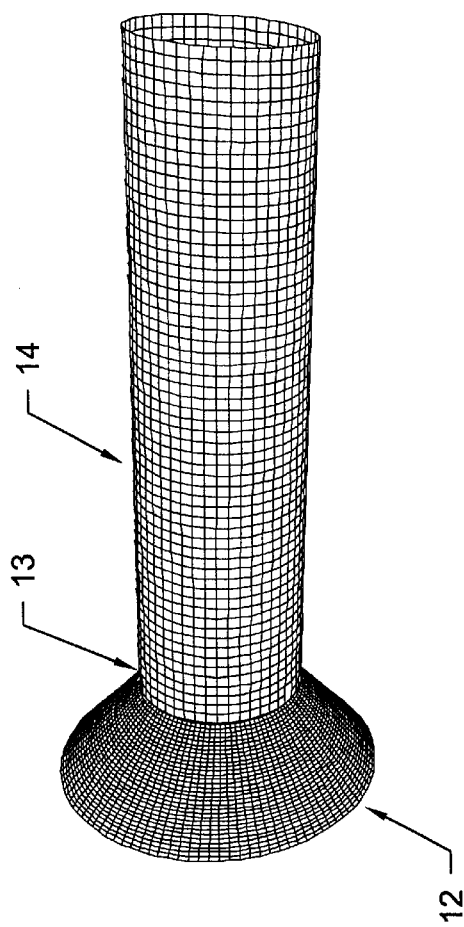
FIG. 1A is an isometric view of a mandrel and tubular member of the present invention before impact forces are applied.
Figure 1B:
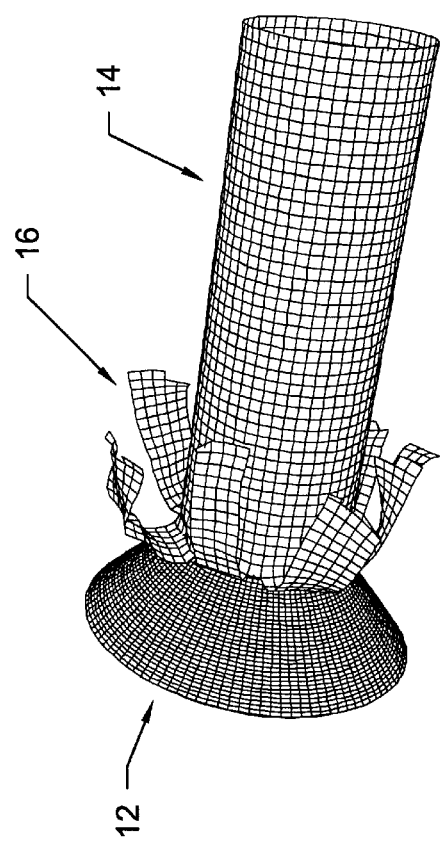
FIG. 1B illustrates the rupturing of the tubular member by the mandrel upon impact.

The controlled fracture or rupturing mechanism of the present invention is based on the concept that, when an over-sized plunger with a tapered surface (mandrel 12) is forced into a thin-wall tubing 14 of the generally same shape, pressure is exerted on the edge of the tubing from the inside, as illustrated in FIGS. 1A and 1B. The pressure initially expands the size of the thin-wall tubing, first elastically until the yielding strength of the metal is reached and then plastically. The tubing eventually fractures or ruptures 16 at the edge when the ultimate tensile capacity of the material is exceeded. This process of expanding and fracturing the thin-wall tubing 14 is repeated and energy dissipated as the mandrel 12 proceeds forward. This process can be applied to tubes manufactured from a variety of materials, including, but not limited to, steel, aluminum, fiber reinforced plastic (FRP), polymers such as high density polyethylene, and concrete or other ceramics.

Although this concept may be used with both brittle materials and ductile materials, brittle materials, such as frangible aluminum, ceramics, or concrete, fragment during the process and produce shrapnel that could pose a hazard to nearby traffic or pedestrians. Therefore, the present invention anticipates the use of ductile materials or brittle materials which are appropriately coated so as not to produce shrapnel-like fragments. Ductile materials, such as steel, polymers, or FRP materials with longitudinal reinforcement, tear into a number of longitudinal strips that remain attached to the undeformed portions of the tubular energy absorber.

The amount and rate of energy dissipation can be controlled by varying the shape, size, thickness, and strength of the thin-wall tubing 14 and the number of tubes. The location and required force level of the rupture can be controlled by incorporating stress concentrators on the tubing, using holes 17, slots 18, notches, cuts, scores and strengtheners such as gussets 19, shown in FIGS. 3A and 4A, or on the mandrel 12, using raised edges 30 as shown in FIG. 2C, or varying the geometrical shape of the mandrel. Further stress concentrators may include the use of preferential material orientation such as fiber alignment in fiber reinforced plastics or cold rolling of metals to produce elongated grain boundaries.

Figure 2A:
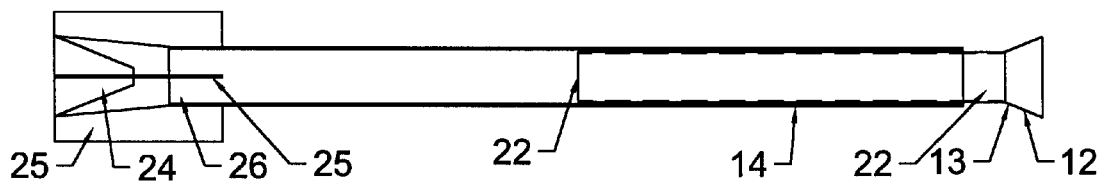
FIG. 2A is a side elevation view of an embodiment of the present invention having a mandrel with a forward tubular extension and a tubular member with a second mandrel.
Figure 2B:
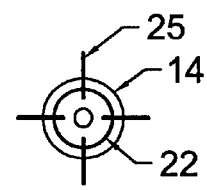
FIG. 2B is an end view of the illustration of FIG. 2A.
Figure 2C:
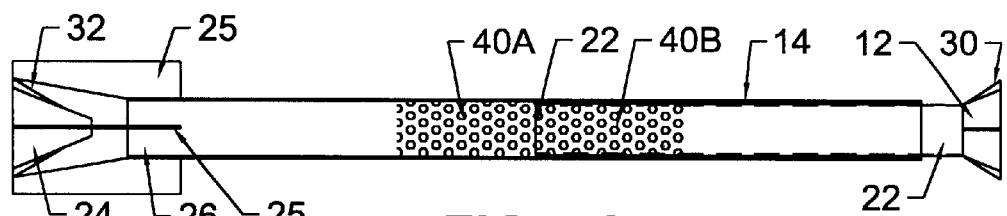
FIG. 2C is a side elevation view of an embodiment of the present invention with the first and second mandrels having stress concentrators.
Figure 2D:
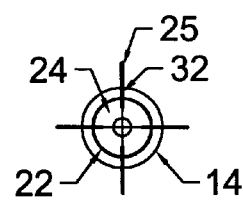
FIG. 2D is an end view of the illustration of FIG. 2C.

FIG. 2A shows a two-stage splitting system that involves splitting first one tube 14 and then another 22. The first tube 14 is attached to a roadside safety device (not shown). Initially upon impact of a vehicle with an impact head (not shown in FIG. 2A), the hollow tube extension 22 on mandrel 12 on the right is pushed into the outer tube 14. The mandrel 12 engages outer tube 14, causing it to split or rupture as illustrated in FIG. 1. After further displacement, the hollow tube extension 22 contacts a second, conical shaped mandrel 24 on the far end 26 of the outer tube 14 and is itself split. Each rupturing allows for controlled absorption of impact energy. Mandrel 24 is supported to outer tube 14 by gussets 25.

FIG. 2C illustrates a two stage system with gusset plates or raised edges 30 and 32 extending outward from the mandrels 12 and 24, respectively. These gusset plates 30 and 32 illustrate an example of a stress concentrator placed on the outer tube. The tubes may be provided with slots or strengthening members to control the rupturing process.

In addition, the controlled fracturing mechanism can be used in combination with other means of energy dissipation. Energy absorbing materials 40A and 40B (FIG. 2C) (e.g., aluminum honeycomb or composite tube, etc.) can also be placed inside of the tubes to increase the energy dissipation capacity as shown in FIG. 2C.

For end-on impacts, the vehicle will contact the impact plate 50, i.e., end of the impact head, and push it forward. This in turn will push the mandrel forward into the thin-wall tubing and start the process of expanding and fracturing/bursting of the tubing. This process will continue until: (a) the impacting vehicle is brought to a safe and controlled stop; (b) the entire length of the tubing is fractured; or (c) the impacting vehicle yaws out and disengages from the impact head.

For impacts that are end-on at a large angle, the impacting vehicle will initiate the controlled fracturing/bursting process until the thin-wall tubing is bent out of the way or the mandrel disengages from the thin-wall tubing, and then gate behind the device. Similarly, the impacts on the side of the thin-wall tubing 14 near the end of the device cause the thin-wall tubing will be bent out of the way, allowing the vehicle to gate behind the device. Thus, when struck on the corner, either on the end or the side of the cushion, the energy absorbing mechanism begins to collapse longitudinally providing lateral resistance as it begins to bend out of the way.

For impacts into the side of the thin-wall tubing downstream of the beginning of length-of-need, the thin-wall tubing will act like a barrier and contain and redirect the impacting vehicle. An anchoring mechanism will be necessary to resist the tensile forces acting on the tubing to contain and redirect the vehicle. Note that this requirement of containment and redirection is applicable only for devices that have redirective capability, such as a terminal or a redirective crash cushion.

A roadside safety device utilizing the controlled fracture mechanism consists of a few major components, as illustrated in FIGS. 3A and 4A Thin-wall tubing 14 is utilized. The tubing may have a circular, square, or rectangular cross-section. The edge of the front end of the tubing (i.e., the end into which the mandrel is attached) may have notches or slots to control the location(s) of the fracture for the tubing. The tubing may also have longitudinal slots cut along portions of its length to control the rate of energy dissipation.

An impact head/plate 50 is provided. Details of the impact head/plate are shown in FIGS. 3B and 4B. The impact head 50 consists of an impact plate 51; a means to provide mechanical interlock 52 between the impact head and the front of the impacting vehicle, such as raised edges around the impact plate 50; and a mandrel 12 welded to the back of the impact plate 50.

The mandrel 12 is much stronger (having a greater tensile strength, a greater thickness, or greater hardness) than the spitting tube 14 to prevent the mandrel from deforming. The mandrel 12 need not have the same cross-sectional shape as the thin-wall tubing, however, there must be only small clearances between the mandrel and the tubing in order to prevent misalignment. For example, channel or wide flange shapes cold be used with rectangular frame rail elements as long as the height and depth of the open sections were close to the same as the clear opening in the tube.

The head 13 of the mandrel 12 is tapered so that only the leading portion of the mandrel head 13 initially will fit into the thin-wall tubing. The mandrel 12 may have stress concentrators, e.g., a particular geometrical shape or raised edges, to control where the thin-wall tubing will fracture. For square or rectangular tubes, the mandrel may have a corresponding square or rectangular shape that flares outward. This type of tube/mandrel combination assures that the tube splits at the corners where strain hardening during manufacturing has made the metal less ductile.

As mentioned previously, the controlled fracture mechanism of the present invention may be used in combination with other forms of energy dissipation. One such design (FIG. 2C) may include the placement of some form of energy absorbing material 40A and 40B, such as aluminum honeycomb or composite tube inside the thin-wall tubing. As the mandrel proceeds forward, the mandrel will fracture the thin-wad tubing as well as crush or compress the energy absorbing material inside the tubing for additional energy absorption.

A composite tube trailer or truck mounted attenuator utilizes a crushable composite beam as its primary energy dissipation mechanism. There are two embodiments of this device, shown in FIGS. 3A and 4A. One embodiment, shown in FIG. 4A, uses telescoping frame rail elements 70 and 72 to maintain lateral stability and alignment for the attenuator and utilizes the controlled fracture concept with composite tubes to provide the energy dissipation. Frame 60 is mounted to the trailer or truck to support the head 50 and energy absorption mechanism 75. It is envisioned that cables or thin steel straps (not shown) may be used to brace the frame 60. Cables may be attached to the back of the frame on one side and to the front of the frame on the other side to prevent lateral "racking" of the frame system.

Another embodiment utilizes controlled fracture frame rail elements in addition to composite tube energy absorbers as shown in FIG. 3A. The present invention may have energy absorbers placed inside of the telescoping tubes or outside.

Although the invention has been described with reference to a specific embodiment, this description is not meant to be construed in a limiting sense. On the contrary, various modifications of the disclosed embodiments will become apparent to those skilled in the art upon reference to the description of the invention. It is therefore contemplated that the appended claims will cover such modifications, alternatives, and equivalents that fall within the true spirit and scope of the invention.

What is claimed is:

1. A crash attenuation system comprising:
   an impact head;
   an energy absorption mechanism attached to said impact head, said energy absorbing mechanism further comprising:
   a first mandrel having a first tensile strength;
   a tubular member having a second tensile strength; said first mandrel receivable within a first end of said tubular member such that upon impact forces being applied to said impact head, said first mandrel is urged through said tubular member rupturing said tubular member thereby absorbing said impact forces; and
   means for selectively controlling said rupturing along a length of said tubular members.

2. The system of claim 1 further comprising a frame, said impact head attached to said frame, and said energy absorption mechanism disposed between said head and said frame.

3. The system of claim 2 wherein said frame is mountable to an object selected from the group consisting of a truck, a trailer, a guardrail, a median barrier end treatment, and a crash cushion.

4. The system of claim 1 wherein said first tensile strength is greater than said second tensile strength.

5. The system of claim 1 wherein said means for selectively controlling said rupturing is selected from the group consisting of slots placed at predetermined locations along said length, scorings at predetermined locations along said length, gussets placed at predetermined locations along said length, preferential material orientations at predetermined locations along said length, stress concentrators on said first mandrel cooperating with slots placed at predetermined locations along said length, and stress concentrators on said first mandrel cooperating with gussets placed at predetermined locations along said length.

6. The system of claim 1 wherein said first mandrel further comprises:
a forward tubular extension, said extension extending into said first end of said tubular member; and
said tubular member further comprises:
a second mandrel at a second end of said tubular member, said second mandrel receivable within said forward tubular extension when said first mandrel moves from a first position to a second position upon said impact forces being applied to said impact head.

7. The system of claim 6 wherein said means for selectively controlling said rupturing is selected from the group consisting of slots placed at predetermined locations along said length, scorings at predetermined locations along said length, gussets placed at predetermined locations along said length, preferential material orientations at predetermined locations along said length, stress concentrators on said first mandrel cooperating with slots placed at predetermined locations along said length, and stress concentrators on said first mandrel cooperating with gussets placed at predetermined locations along said length.

8. The system of claim 1 wherein said first mandrel is generally rectangular and said tubular member is generally rectangular and said rupturing of said tubular member is confined to corners of said rectangular tubular member.

9. The system of claim 1 further comprising:
energy absorbing material within said tubular member.

10. The system of claim 6 further comprising:
energy absorbing material within said tubular member and said forward tubular extension.

11. The system of claim 1 further comprising:
a means for maintaining a generally perpendicular alignment between said impact head and said frame.

12. The system of claim 11 wherein said alignment means further comprises:
a first tubular alignment member perpendicularly attached at a first end to said impact head;
a second tubular alignment member perpendicularly attached at a first end to said frame;
a second end of said first tubular alignment member receivable within a second end of said second tubular alignment member such that upon said impact forces being applied to said impact head said second end of said first tubular alignment member is urged through said second end of said second tubular alignment member.

13. A crash attenuation system comprising:
an impact head;
an energy absorption mechanism attached to said impact head, said energy absorbing mechanism further comprising:
a first mandrel having a first tensile strength;
a tubular member having a second tensile strength, said first mandrel receivable within a first end of said tubular member such that upon impact forces being applied to said impact head, said first mandrel is urged through said tubular member rupturing said tubular member thereby absorbing said impact forces;
means for selectively controlling said rupturing along a length of said tubular member;
a means for maintaining a generally perpendicular alignment between said impact head and
said absorption mechanism, said alignment means further comprises:
a first tubular alignment member perpendicularly attached at a first end to said impact head;
a second tubular alignment member perpendicularly attached at a first end to said absorption mechanism;
a second end of said first tubular alignment member receivable within a second end of said second tubular alignment member such that upon said impact forces being applied to said impact head said second end of said first tubular alignment member is urged through said second end of said second tubular alignment member; and
an alignment mandrel attached to said first tubular alignment member, said alignment mandrel receivable within said second end of said second tubular alignment member such that upon said impact forces being applied to said impact head said alignment mandrel is urged through said second end of said second tubular alignment member rupturing said second tubular alignment member thereby assisting in absorption of said impact forces.

14. A crash attenuation system comprising:
an impact head;
an energy absorption mechanism attached to said impact head, said energy absorbing mechanism further comprising:
a first mandrel having a first tensile strength;
a tubular member having a second tensile strength, said first mandrel receivable within a first end of said tubular member such that upon impact forces being applied to said impact head, said first mandrel is urged through said tubular member rupturing said tubular member thereby absorbing said impact forces, said first mandrel is generally rectangular and said tubular member is generally rectangular and said rupturing of said tubular member is confined to corners of said rectangular tubular member.

* * * * *

UNITED STATES PATENT AND TRADEMARK OFFICE
CERTIFICATE OF CORRECTION

PATENT NO. : 6,308,809 B1
DATED : October 30, 2001
INVENTOR(S) : John D. Reid, John R. Rohde and Dean L. Sicking It is certified that error appears in the above-identified patent and that said Letters Patent is hereby corrected as shown below:

Column 1,
Line 4, before "The present invention," insert:
-- This invention was made in part during work supported by a grant/contract, Contract No. DTRS57-98-C-00079 from DOT/RSPA/Volpe National Transportation System Center.
The government may have certain rights in this invention. --.

Signed and Sealed this

Fourteenth Day of February, 2006

JON W. DUDAS
*Director of the United States Patent and Trademark Office*